United States Patent
Rosen et al.

(10) Patent No.: US 11,558,003 B2
(45) Date of Patent: Jan. 17, 2023

(54) METHOD AND DEVICE FOR OPERATING AN ELECTRIC MACHINE FOR OUTPUTTING A PREDEFINED TORQUE AND A PREDEFINED ROTATIONAL SPEED

(71) Applicant: Robert Bosch GmbH, Stuttgart (DE)

(72) Inventors: Alexander Rosen, Osnabrueck (DE); Michael Bangerter, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 151 days.

(21) Appl. No.: 16/765,137

(22) PCT Filed: Oct. 10, 2018

(86) PCT No.: PCT/EP2018/077599
§ 371 (c)(1),
(2) Date: May 18, 2020

(87) PCT Pub. No.: WO2019/096497
PCT Pub. Date: May 23, 2019

(65) Prior Publication Data
US 2020/0313600 A1    Oct. 1, 2020

(30) Foreign Application Priority Data

Nov. 20, 2017 (DE) .................... 10 2017 220 685.3

(51) Int. Cl.
*H02P 29/66* (2016.01)
*H02P 23/00* (2016.01)
*B60K 1/00* (2006.01)

(52) U.S. Cl.
CPC .............. *H02P 29/662* (2016.11); *B60K 1/00* (2013.01); *H02P 23/009* (2013.01)

(58) Field of Classification Search
USPC .................................................. 318/400.08
See application file for complete search history.

(56) References Cited

U.S. PATENT DOCUMENTS

| 2011/0025238 A1 | 2/2011 | Ueda et al. |
| 2013/0020971 A1* | 1/2013 | Gallegos-Lopez ........................ H02P 21/0089 318/400.02 |

(Continued)

FOREIGN PATENT DOCUMENTS

| DE | 102012211315 | 1/2013 |
| JP | 2002095300 | 3/2002 |

(Continued)

OTHER PUBLICATIONS

International Search Report for Application No. PCT/EP2018/077599 dated Jan. 3, 2019 (English Translation, 3 pages).

*Primary Examiner* — Jorge L Carrasquillo
(74) *Attorney, Agent, or Firm* — Michael Best & Friedrich LLP

(57) ABSTRACT

The invention relates to a method and device for operating an electric machine (10) for outputting a predefined torque and a predefined rotational speed, comprising the following steps: providing (420) a first and a second operating mode for the operation of the electric machine (10); detecting (430) a temperature of the electric machine (10); and operating the electric machine (10) in the first operating mode (440) if the detected temperature falls below a threshold value, and operating the electric machine (10) in the second operating mode (450) if the detected temperature corresponds with the threshold value or exceeds same. During the operation of the electric machine (10) in the second operating mode (450), with the resulting output of the predefined torque and the predefined rotational speed, the magnetic stator flux of the electric machine (10) is reduced compared with the magnetic stator flux of the electric machine (10) during the operation of the electric machine (10) in the first (Continued)

operating mode (440), with the resulting output of the predefined torque and the predefined rotational speed.

10 Claims, 2 Drawing Sheets

(56) References Cited

U.S. PATENT DOCUMENTS

| | | | |
|---|---|---|---|
| 2013/0119905 A1* | 5/2013 | Bevilaqua | H02P 29/67 |
| | | | 318/400.22 |
| 2017/0294865 A1 | 10/2017 | Inokuma et al. | |
| 2018/0091075 A1* | 3/2018 | Musil | H02P 6/28 |

FOREIGN PATENT DOCUMENTS

| | | | | |
|---|---|---|---|---|
| JP | 2002095300 A | * | 3/2002 | |
| JP | 2005348510 A | * | 12/2005 | .......... H02P 29/0044 |
| JP | 2007026700 A | * | 2/2007 | .......... B60L 11/1803 |
| JP | 2008155683 | | 7/2008 | |
| JP | 2008155683 A | * | 7/2008 | |
| WO | WO-2008102916 A1 | * | 8/2008 | ............ B60W 10/08 |
| WO | 2010116769 | | 10/2010 | |

\* cited by examiner

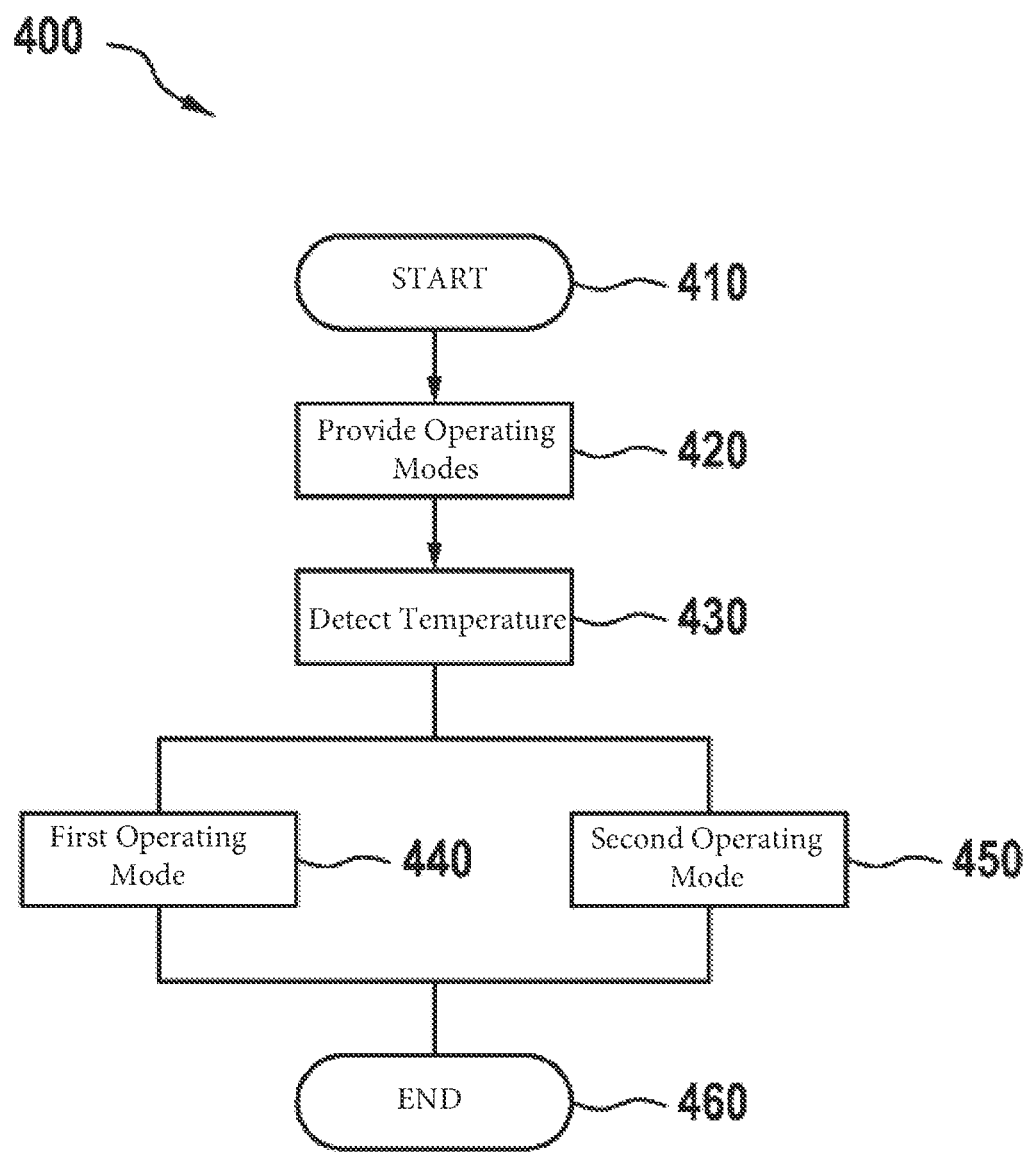

METHOD AND DEVICE FOR OPERATING AN ELECTRIC MACHINE FOR OUTPUTTING A PREDEFINED TORQUE AND A PREDEFINED ROTATIONAL SPEED

BACKGROUND OF THE INVENTION

The invention relates to a method and a device for operating an electric machine for outputting a predetermined torque and a predetermined rotational speed. The invention furthermore relates to a logic unit, a drive train having a corresponding logic unit and a vehicle having a corresponding drive train and a computer program and a machine-readable storage medium.

An electric drive, in particular an electric machine, heats up during operation. To enable an electric machine to output a torque and rotate, magnets are incorporated in an electric machine, in particular in the rotor. The material properties of magnets are temperature-dependent. The greater the temperature of the magnets, the smaller the permissible opposing magnetic field load. If the permissible opposing magnetic field load is exceeded by an applied opposing magnetic field, the magnets demagnetize irreversibly. With at least partially demagnetized magnets, an electric machine no longer delivers the specified power or it fails completely if the magnets are demagnetized. During operation of an electric machine, the magnets are exposed to an opposing magnetic field. So long as this is smaller than the permissible opposing magnetic field load, the magnets are not damaged. With an increasing load on the electric machine, both motoric and generatoric, and therefore associated increasing phase currents through the electric machine, the opposing magnetic field forming within the electric machine becomes greater. Very high phase current amplitudes within the electric machine are produced temporarily when making the so-called active short circuit of the electric machine. To this end, the three phases, for example, of an electric machine are connected by the inverter to a common potential, in particular the negative potential of a battery. An electric machine is switched to the active short circuit if a fault is present in the electric drive system, so that the electric machine is brought into a safe state. Graphs which represent the torque of the electric machine over its rotational speed and plot the value of the corresponding current amplitudes when making an active short circuit show that the highest phase current amplitudes within the electric machine form if the active short circuit is made in the generatoric vertex. The greatest opposing magnetic field within the electric machine forms accordingly at this operating point, which loads the magnets. For reliable operation of an electric machine, it must be possible to make the active short circuit at any time. To prevent damage or a defect in the electric machine in the event of a fault, it must therefore be ensured that the generated opposing magnetic field is always smaller than the permissible opposing magnetic field load. Since the permissible opposing magnetic field load decreases with the increase in temperature, the operating range of the electric machine must be restricted when the temperature increases. To this end, the torque to be output was hitherto limited when the temperature of the electric machine increased. Consequently, the current amplitudes generated when making an active short circuit and the generated opposing magnetic field are lower than at low temperatures. Reliable operation of the electric machine is thus ensured over a large temperature range. However, the disadvantage with this is that the torque which can be output is limited at higher temperatures. If such a drive is incorporated in a vehicle, the implication for the driver of a vehicle is that the acceleration of the vehicle varies subject to the temperature of the electric machine.

In the prior art, the field load occurring when making the active short circuit therefore determines the rotor limit temperature and thereby also has a direct influence on the achievable continuous performance or continuous capacity with regard to the torque or power of the electric machine. In addition to limiting the torque which can be output, the cooling of the rotor can be improved to lower the magnet temperature, e.g. by active liquid cooling of the motor shaft. Alternatively, the machine can also be configured to be overdimensioned in order to slow down the heating of the rotor. Another solution is the use of magnetic material with a higher content of heavy rare earths, which have a lower tendency to demagnetize.

Solutions are therefore required which at least minimize the restriction of the operating range of an electric machine subject to the temperature, in particular the limiting of the torque to be output, in particular without implementing structural changes to the machine or the configuration thereof. The achievable continuous torque and the achievable continuous power of the electric machine are advantageously increased.

SUMMARY OF THE INVENTION

A method for operating an electric machine for outputting a predetermined torque and a predetermined rotational speed is provided. The method comprises the steps: providing a first and a second operating mode for the operation of the electric machine; detecting a temperature of the electric machine; operating the electric machine in the first operating mode when the detected temperature is below a threshold value and operating the electric machine in the second operating mode when the detected temperature corresponds to the threshold value or exceeds this, wherein, when the electric machine is operated in the second operating mode with the resultant output of the predetermined torque and the predetermined rotational speed, the magnetic stator flux of the electric machine is reduced in comparison to the magnetic stator flux of the electric machine when the electric machine is operated in the first operating mode with the resultant output of the predetermined torque and the predetermined rotational speed.

A method for operating or controlling an electric machine is provided. The electric machine is operated in such a way that a predetermined torque is output or received by the machine and the rotational speed of the electric machine thereby corresponds to a predetermined rotational speed. Ideally, the actual values during operation or during the control correspond to the predetermined values; a minimum deviation possibly occurs due to limited control accuracy of the controller used. So as to not increase the wording, "outputting a torque" also includes "receiving a torque" within the context of this description; for example, in the generatoric mode of an electric machine, when the vehicle is in coasting mode. Equally, the wording "output of a predetermined rotational speed" includes positive and negative rotational speeds, which result from the operation or the control of the electric machine. Two operating modes are provided for operating the electric machine. The different operating modes can be realized by means of hardware or software. These can be different controller modules, software algorithms, parameter sets or characteristics or filter modules to be used. A temperature of the electric machine is furthermore detected. This means a temperature is detected which enables at least a temperature of a component of the electric machine, for example the housing, the stator or the rotor or the magnets of the electric machine, to be determined. Subject to the detected temperature, the operation of the electric machine takes place in a first or a second operating mode. When the temperature is below a, preferably predeterminable, threshold value, the operation of the electric machine takes place in the first operating mode. This is preferably the usual operation of the electric machine for outputting the predetermined torque and the predetermined rotational speed. In this case, the operation of the electric machine preferably takes place efficiently, with the lowest possible electrical losses. When the temperature corresponds to this threshold value or exceeds this threshold value, the operation of the electric machine takes place in the second operating mode. In this case, the magnetic stator flux of the electric machine is reduced in comparison to the magnetic stator flux of the electric machine when the operation takes place in the first operating mode with the output of the predetermined torque and the predetermined rotational speed. In particular, during the operation in the second operating mode, increased electrical losses are established in the inverter and the electric machine. In this case, however, the advantageous effect of the reduction in the potential temporary current amplitudes outweigh the disadvantageous slightly increased losses during the operation in the second operating mode. Making an active short circuit with a reduced magnetic stator flux in the electric machine advantageously results in significantly smaller temporary current amplitudes, for example 20% smaller current amplitudes, so that a lower opposing magnetic field is established. Therefore, even if it is necessary to make the active short circuit, demagnetization of the magnets of the electric machine is prevented despite the increased temperatures and when outputting the predetermined torque and the predetermined rotational speed. In particular, the reduction in the stator flux leads to a reduction in the maximum achievable torque, for example by 10%. However, in the approach described here, this restriction is significantly lower than the torque limitation, for example by 30%, purely subject to the temperature.

In another configuration of the invention, in the second operating mode, the reduction of the magnetic stator flux of the electric machine takes place by means of the field weakening controller.

The reduction in the magnetic stator flux when outputting the predetermined torque and the predetermined rotational speed takes place by means of the field weakening controller. In particular, when the maximum phase voltage is reached, subject to the rotational speed, a field weakening controller restricts the stator flux for the operation of a machine at high rotational speeds. This functionality is expanded in the second operating mode, in that the stator flux is, in particular additionally, reduced subject to the detected temperature. In particular, the maximally generated opposing field strength is therefore reduced when making the active short circuit. An option for reducing the stator flux of the electric machine is advantageously provided, which enables the electric machine to operate at increased temperatures and when outputting the predetermined torque and the predetermined rotational speed.

In another configuration of the invention, in the second operating mode, the reduction in the magnetic stator flux of the electric machine takes place by increasing the negative d-current.

The reduction in the magnetic stator flux when outputting the predetermined torque and the predetermined rotational speed takes place by increasing the negative d-current. In particular, the level of the stator flux is varied by varying the negative d-current. In particular, at low rotational speeds, the negative d-current is increased to increase the maximum efficiency and the torque of the machine. This method is known in the prior art as MTPA (maximum torque per ampere) or MMPA (maximum moment per ampere). This functionality is expanded in the second operating mode and the negative d-current is increased subject to the detected temperature, in particular in relation to the MTPA method, and the stator flux is therefore reduced. In particular, this reduces the maximally generated opposing field strength when making the active short circuit. An option for reducing the stator flux of the electric machine is advantageously provided, which enables the electric machine to operate at higher temperatures and when outputting the predetermined torque and the predetermined rotational speed.

In another configuration of the invention, in the second operating mode, the magnetic stator flux of the electric machine is more strongly reduced with the increasing detected temperature of the electric machine.

The higher the detected temperature, the lower the permissible opposing field strength of the magnets. To prevent possible demagnetization of the magnets, the magnetic stator flux is further reduced with the increasing temperature. Further reduced temporary current amplitudes are advantageously produced when making an active short circuit with a further reduced magnetic stator flux in the electric machine, so that a lower opposing magnetic field is established and damage to the magnets is prevented.

In another configuration of the invention, the detection of the temperature includes determining the temperature of the rotor of the electric machine or the magnets of the electric machine.

The detection of the temperature of the electric machine preferably includes determining the temperature of the rotor in which the magnets are incorporated, or determining the temperature of the magnets themselves. To this end, one or, for example, more sensors can be used, which record the temperature directly at the respective components. The temperatures of the magnets or the rotor can also be ascertained via indirect measurements, preferably using thermal modeling. Precise knowledge of the temperature of the magnets advantageously enables the precise determination of the necessary reduction in the stator flux which is sufficient to reliably prevent demagnetization of the magnets in the electric machine.

The invention furthermore relates to a computer program which is designed to execute one of the methods described above.

The invention furthermore relates to a machine-readable storage medium on which the described computer program is stored.

The invention furthermore relates to a logic unit for operating an electric machine for outputting a predetermined torque and a predetermined rotational speed. The logic unit is designed to provide a first and a second operating mode for operating the electric machine, to detect a temperature of the electric machine, to operate the electric machine in the first operating mode when the detected temperature is below a threshold value and to operate the electric machine in the second operating mode when the detected temperature corresponds to the threshold value or exceeds this, wherein, when the electric machine is operated in the second operating mode with the resultant output of the predetermined torque and the predetermined rotational speed, the magnetic stator flux of the electric machine is reduced in comparison to the magnetic stator flux of the electric machine when the electric machine is operated in the first operating mode with the resultant output of the predetermined torque and the predetermined rotational speed.

A logic unit is provided, which is designed to operate or control an electric machine. The electric machine is operated in such a way that a predetermined torque is output or received by the machine and the rotational speed of the electric machine thereby corresponds to a predetermined rotational speed. Ideally, the actual values during operation or during the control correspond to the predetermined values; a minimum deviation possibly occurs due to limited control accuracy of the controller used. Two operating modes are provided for operating the electric machine. The different operating modes can be realized by means of hardware or software. The logic unit further detects a temperature of the electric machine. Subject to the detected temperature, the operation of the electric machine takes place in a first or a second operating mode. When the temperature is below a, preferably predeterminable, threshold value, the operation of the electric machine takes place in the first operating mode. When the temperature corresponds to this threshold value or exceeds this threshold value, the operation of the electric machine takes place in the second operating mode. In this case, the magnetic stator flux of the electric machine is reduced in comparison to the magnetic stator flux of the electric machine when the operation takes place in the first operating mode with the output of the predetermined torque and the predetermined rotational speed. Making an active short circuit with a reduced magnetic stator flux in the electric machine advantageously results in significantly smaller temporary current amplitudes, so that a lower opposing magnetic field is established. Therefore, even in the event that it is necessary to make the active short circuit, demagnetization of the magnets of the electric machine is prevented despite the increased temperatures and when outputting the predetermined torque and the predetermined rotational speed.

The invention furthermore relates to a device having a described logic unit. This device is, in particular, an electric machine or a control device or an inverter.

A device is provided, which comprises the described logic unit. In addition to the logic unit, the device preferably comprises, for example, power semiconductor switches by means of which a supply voltage is converted into a three-phase alternating voltage for supplying the electric machine. This device can be, in particular, a control device, a pulse-width-modulation inverter or, in an integrated case, an electric machine itself.

Different variants for integrating a logic unit for optimized operation of an electric machine are advantageously provided.

The invention furthermore relates to a drive train of a vehicle having a described device. In particular, the drive train comprises a control unit or an inverter for controlling the electric machine. The drive train preferably further comprises a battery for supplying the electric machine with electrical energy by means of the inverter. Likewise, by means of the inverter, the electrical energy which is generated when the electric machine is in generatoric operation can also be fed into the battery. Such a drive train serves, for example, for driving an electrified vehicle. Reliable operation of the drive train is enabled by means of the method and the device.

The invention furthermore relates to a vehicle having a described drive train. A vehicle is therefore advantageously provided, which can be reliably operated by means of the method and the device, wherein demagnetization of the magnets is reliably prevented despite higher temperatures of the electric machine and when outputting the predetermined torque and the predetermined rotational speed.

It goes without saying that the features, properties and advantages of the method according to the invention relate and can be applied accordingly to the logic unit, the device or the drive train and the vehicle, and vice versa.

BRIEF DESCRIPTION OF THE DRAWINGS

Further features and advantages of embodiments of the invention are revealed in the description below, with reference to the accompanying drawings.

The invention shall be explained in more detail below, with the aid of several figures, which show.

DETAILED DESCRIPTION

Figure 1:
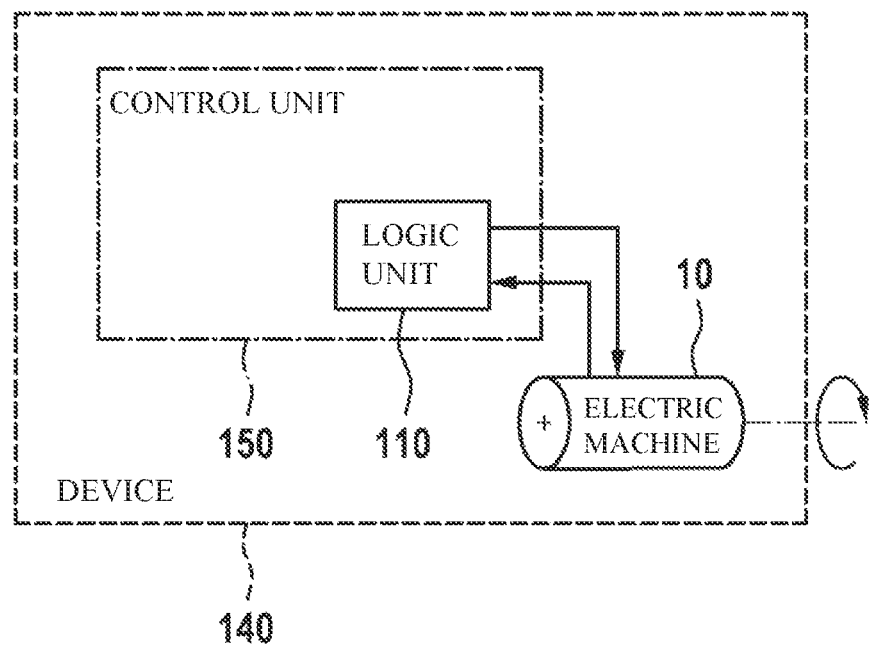
FIG. 1 a schematic illustration of a device having a logic unit for operating an electric machine, FIG. 2 a schematically illustrated vehicle having a drive train, FIG. 3 a schematically illustrated flow chart for a method for operating an electric machine.

FIG. 1 shows a device 140, which comprises a control unit 150 and a logic unit 110 for operating an electric machine 10. The logic unit 110 operates or controls the electric machine 10 subject to a detected temperature of the electric machine 10. The logic unit 110 can be arranged separately from the electric machine 10, for example in a control device 150 or in an inverter. The logic unit 110, the control device 150 and/or the electric machine 10 can further be arranged together within a housing or within a device 140.

Figure 2:
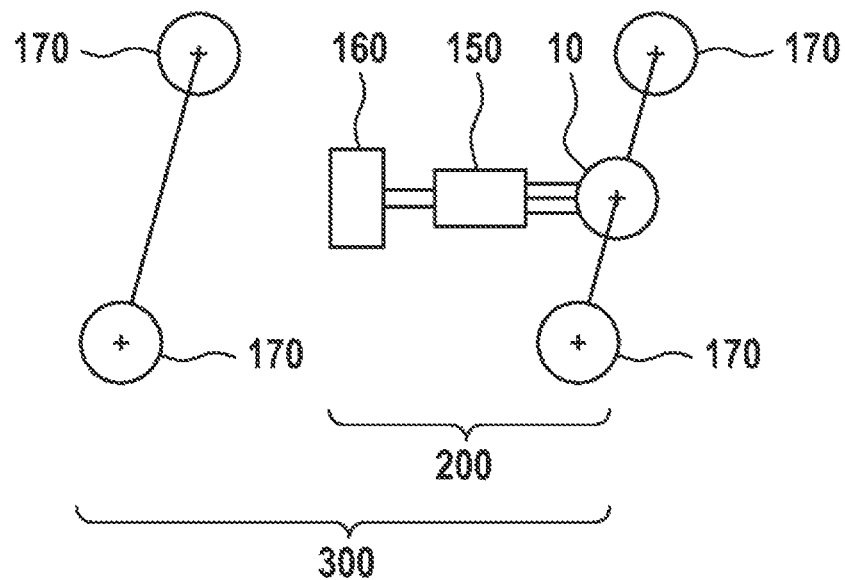

FIG. 2 shows a schematically illustrated vehicle 300 having a drive train 200. By way of example, the illustration shows a vehicle having four wheels 170, wherein the invention can equally be used in any vehicle having any number of wheels on land, on water and in the air. By way of example, the drive train 200 comprises a battery 160 for supplying the electric machine 10 of the drive train 200. The drive train further preferably comprises a control device 150 or an inverter, which converts a direct current from the battery 160 into an alternating current. The electric machine 10 is coupled at least to one of the wheels 170 and is designed to drive this.

FIG. 3 shows a schematic sequence of a method 400 for operating an electric machine 10 for outputting a predetermined torque and a predetermined rotational speed. The method begins with step 410. A first and a second operating mode for operating the electric machine 10 are provided in step 420. A temperature of the electric machine 10 is detected in step 430. In step 440, the operation of the electric machine 10 takes place in the first operating mode when the detected temperature is below a threshold value. In step 450, the operation of the electric machine 10 takes place in the second operating mode when the detected temperature corresponds to the threshold value or exceeds this. When the electric machine 10 is operated in the second operating mode with the resultant output of the predetermined torque and the predetermined rotational speed, the magnetic stator flux of the electric machine 10 is reduced in comparison to the magnetic stator flux of the electric machine 10 when the electric machine 10 is operated in the first operating mode with the resultant output of the predetermined torque and the predetermined rotational speed. The method ends with step 460.

The invention claimed is:

1. A method (400) for operating an electric machine (10) for outputting a predetermined torque and a predetermined rotational speed, the method comprising:
providing (420) a first and a second operating mode for the operation of the electric machine (10);
detecting (430) a temperature of the electric machine (10); and
operating the electric machine (10) in the first operating mode (440) when the detected temperature is below a threshold value and operating the electric machine (10) in the second operating mode (450) when the detected temperature equals or exceeds the threshold value,
wherein, the magnetic stator flux of the electric machine (10) operated in the second operating mode (450) is reduced in comparison to the magnetic stator flux of the electric machine (10) operated in the first operating mode (440), and
when the electric machine (10) is operated in the second operating mode (450), making an active short circuit of the electric machine (10) and the inverter that increases electrical losses in the electric machine (10) and the inverter, reduces the magnetic stator flux, and results in lower current amplitudes.

2. A method (400) for controlling the electric machine (10) as claimed in claim 1, wherein, in the second operating mode (450), the reduction of the magnetic stator flux of the electric machine (10) takes place via a field weakening controller.

3. The method (400) for controlling the electric machine (10) as claimed in claim 1, wherein, in the second operating mode (450), the reduction of the magnetic stator flux of the electric machine (10) takes place by increasing the negative d-current.

4. The method (400) for controlling the electric machine (10) as claimed in claim 1, further comprising detecting a temperature of the electric machine (10) and wherein, in the second operating mode (450), the magnetic stator flux of the electric machine (10) is reduced when the detected temperature of the electric machine (10) increases.

5. The method (400) for controlling the electric machine (10) as claimed in claim 1, wherein detecting a temperature of the electric machine (10) includes determining a temperature of the rotor (20) of the electric machine (10) or determining a temperature of the magnets (30) of the electric machine (10).

6. A non-transitory computer-readable storage medium containing instructions that when executed by a computer cause the computer to
determine a temperature of an electric machine (10);
operate the electric machine (10) in a first operating mode 440)) when the determined temperature is below a threshold value; and
operate the electric machine (10) in a second operating mode (450) when the determined temperature equals or exceeds the threshold value,
wherein, the magnetic stator flux of the electric machine (10) operated in the second operating mode (450) is reduced in comparison to the magnetic stator flux of the electric machine (10) operated in the first operating mode (440), and
when the electric machine (10) is operated in the second operating mode (450), making an active short circuit of the electric machine (10) and the inverter that increases electrical losses in the electric machine (10) and the inverter, reduces the magnetic stator flux, and results in lower current amplitudes.

7. A logic unit (110) for operating an electric machine (10) for outputting a predetermined torque and a predetermined rotational speed, wherein the logic unit (110) is configured
to provide a first and a second operating mode for operating the electric machine (10),
to detect a temperature of the electric machine (10);
to operate the electric machine (10) in the first operating mode when the detected temperature is below a threshold value and to operate the electric machine (10) in the second operating mode when the detected temperature equals or exceeds the threshold value,
wherein, the magnetic stator flux of the electric machine (10) operated in the second operating mode (450) is reduced in comparison to the magnetic stator flux of the electric machine (10) operated in the first operating mode (440), and
when the electric machine (10) is operated in the second operating mode (450), making an active short circuit of the electric machine (10) and the inverter that increases electrical losses in the electric machine (10) and the inverter, reduces the magnetic stator flux, and results in lower current amplitudes.

8. A device (140) comprising a logic unit (110) as claimed in claim 7.

9. A drive train (200) of a vehicle (300) having a logic unit (110), the logic unit (110) is configured
to determine a temperature of an electric machine (10);
to operate the electric machine (10) in the first operating mode when the detected temperature is below a threshold value and to operate the electric machine (10) in the second operating mode when the detected equals or exceeds the threshold value,
wherein, the magnetic stator flux of the electric machine (10) operated in the second operating mode (450) is reduced in comparison to the magnetic stator flux of the electric machine (10) operated in the first operating mode (440), and
when the electric machine (10) is operated in the second operating mode (450), making an active short circuit of the electric machine (10) and the inverter that increases electrical losses in the electric machine (10) and the inverter reduces the magnetic stator flux, and results in lower current amplitudes.

10. A vehicle (300) having a drive train (200) as claimed in claim 9.

* * * * *